United States Patent
Chen et al.

(10) Patent No.: US 7,085,310 B2
(45) Date of Patent: Aug. 1, 2006

(54) METHOD AND APPARATUS FOR MANAGING FINGER RESOURCES IN A COMMUNICATION SYSTEM

(75) Inventors: Tao Chen, San Diego, CA (US); Edward G. Tiedemann, Jr., Concord, MA (US); Jun Wang, San Diego, CA (US); Serge Willenegger, Onnens (CH)

(73) Assignee: QUALCOMM, Incorporated, San Diego, CA (US)

( * ) Notice: Subject to any disclaimer, the term of this patent is extended or adjusted under 35 U.S.C. 154(b) by 369 days.

(21) Appl. No.: 09/772,779

(22) Filed: Jan. 29, 2001

(65) Prior Publication Data

US 2002/0101909 A1  Aug. 1, 2002

(51) Int. Cl.
*H04B 1/707* (2006.01)
*H04Q 7/20* (2006.01)
(52) U.S. Cl. .................... 375/147; 375/148; 455/422.1
(58) Field of Classification Search ................ 375/147, 375/148, 144, 346, 347, 349; 370/335, 320, 370/342, 441; 455/422.1, 436, 437, 438, 455/439, 442, 443
See application file for complete search history.

(56) References Cited

U.S. PATENT DOCUMENTS

| | | | | |
|---|---|---|---|---|
| 5,754,583 A | * | 5/1998 | Eberhardt et al. | 375/147 |
| 5,920,549 A | | 7/1999 | Bruckert et al. | 370/331 |
| 6,097,972 A | * | 8/2000 | Saints et al. | 455/572 |
| 6,208,699 B1 | * | 3/2001 | Chen et al. | 375/340 |
| 6,621,808 B1 | * | 9/2003 | Sadri | 370/335 |

FOREIGN PATENT DOCUMENTS

WO  0004648  1/2000

* cited by examiner

*Primary Examiner*—Betsy L. Deppe
(74) *Attorney, Agent, or Firm*—Philip R. Wadsworth; Thien T. Nguyen; S. Hossain Beladi

(57) ABSTRACT

In a communication system, a method and an accompanying apparatus determine a number of available fingers (110A-N) in a receiver (100). A controller (121) adjusts a threshold based on the determined number of the available fingers (110). The adjusted threshold may be one of, or any combination of, a pilot signal search threshold, a lock/unlock threshold, and a combine/un-combine threshold. The number of available fingers (110) may change after the threshold is adjusted.

3 Claims, 3 Drawing Sheets

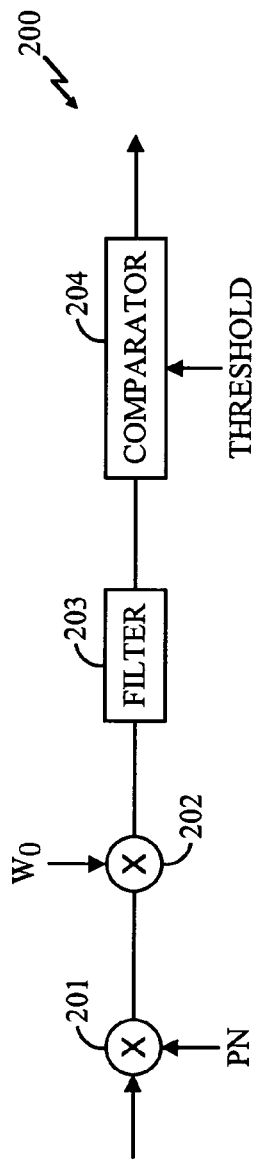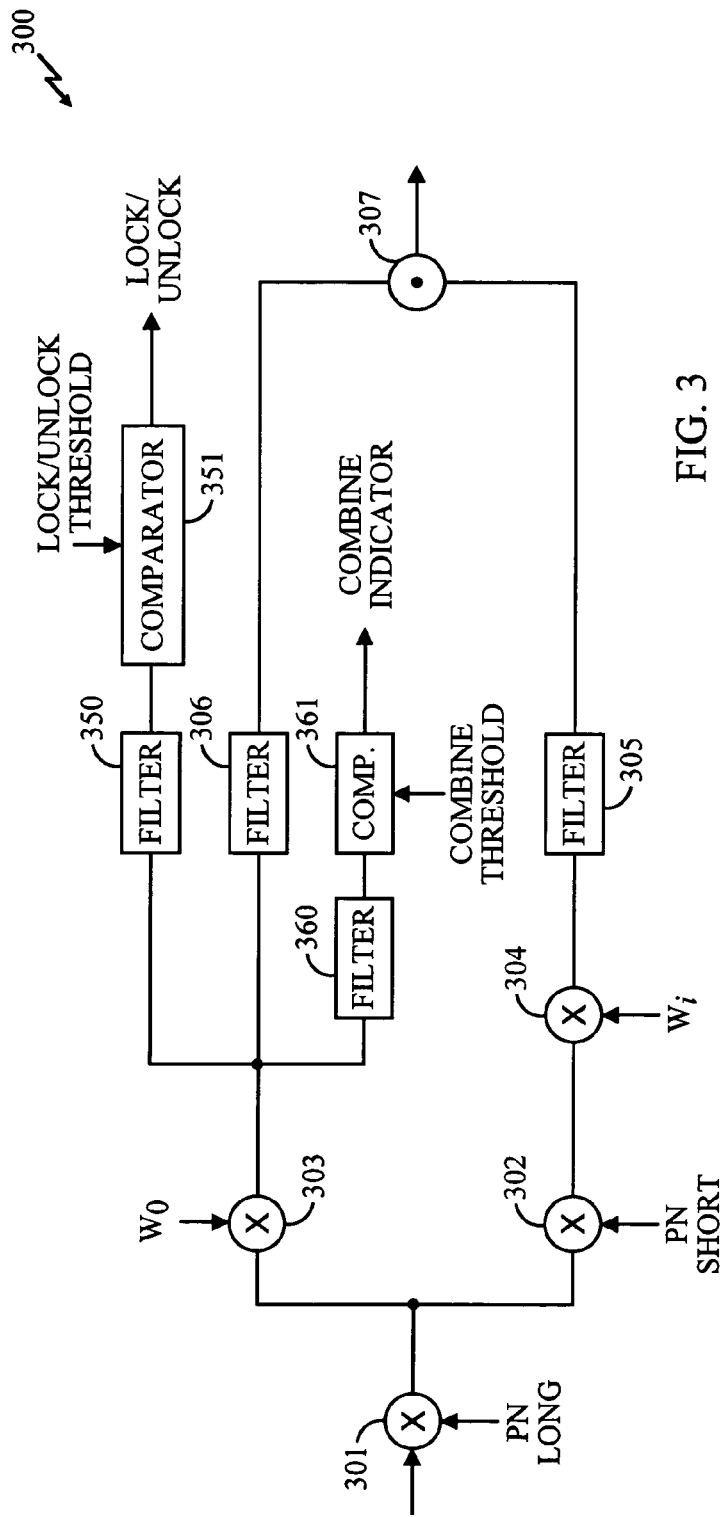

METHOD AND APPARATUS FOR MANAGING FINGER RESOURCES IN A COMMUNICATION SYSTEM

BACKGROUND

I. Field of the Invention

The disclosed embodiments relate to the field of communications, and more particularly, to a method and apparatus for managing finger resources in code division multiple access (CDMA) system.

II. Background

A system for wireless communications in accordance with the CDMA technique has been disclosed and described in various standards published by the Telecommunication Industry Association (TIA). Such standards are commonly known as TIA/EIA/IS-2000, TIA/EIA/95A/B, and WCDMA, among several others. The "$3^{rd}$ Generation Partnership Project" (3GPP) embodied in a set of documents includes Document No. 3G TS 25.211, 3G TS 25.212, 3G TS 25.213, and 3G TS 25.214, known as the WCDMA standard; the "TIA/EIA/IS-95 Remote Station-Base Station Compatibility Standard for Dual-Mode Wideband Spread Spectrum Cellular System" is known as the IS-95 standard; the "TR-45.5 Physical Layer Standard for cdma2000 Spread Spectrum Systems" is known as the CDMA-2000 standard; each incorporated by reference herein.

Typically, a receiver in a CDMA communication system operates in accordance with a RAKE receiver operation. RAKE receivers and their operation are well known. Such a receiver normally demodulates received signals by assigning one or more fingers to each received signal. Before assigning a finger, the correlation energy of each signal is compared to a threshold. A finger may be assigned to the signal when the correlation energy satisfies the threshold. A receiver may receive multi-path signals of a signal transmitted from a source. The receiver may assign a finger to each multi-path signal. The results from several fingers, assigned correspondingly to several multi-path signals, may be combined in the demodulation process to produce a data symbol. A finger may be de-assigned when the signal correlation energy drops below the threshold. In this case, the correlation energy of the signal is, perhaps, too weak to add any value, independently or in combination with other signals, to the demodulation process.

Assigning and de-assigning fingers to a received signal requires substantial processing, and substantial processing delay. It is undesirable to assign a finger to a received signal before assuring that the correlation energy remains adequate for some time during the demodulation process. Moreover, it is undesirable to de-assign a finger before assuring that the correlation energy remains inadequate for some time during the demodulation process. In other situations assigning most or all of the finger resources may limit the receiver capacity to demodulate additional signals. Additionally, one or more fingers may possibly be de-assigned from processing a signal without a substantial degradation in the demodulation performance.

It is to this end as well as others that there is a need for managing finger resources in a communication system receiver.

SUMMARY

In a communication system, a method and an accompanying apparatus provide for efficient management of finger resources. A controller determines a number of available fingers in a receiver. The controller may adjust a threshold based on the determined number of the available fingers. The adjusted threshold may be one of, or any combination of, pilot signal search threshold, lock/unlock threshold, and combine/un-combine threshold. The number of available fingers may change after adjusting the threshold, thereby, allowing management of the number of the available fingers by adjusting the threshold.

BRIEF DESCRIPTION OF THE DRAWINGS

FIG. 2 depicts a block diagram of a searcher for searching pilot signals.

FIG. 3 depicts a block diagram of a finger for demodulating a received signal.

DETAILED DESCRIPTION OF PREFERRED EMBODIMENT(S)

Generally stated, a novel and improved method and an accompanying apparatus provide for an efficient management of finger resources in a code division multiple access communication system. The exemplary embodiment described herein is set forth in the context of a digital communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application may be represented by voltages, currents, electromagnetic waves, magnetic fields or particles, optical fields or particles, or a combination thereof. In addition, the blocks shown in each block diagram may represent hardware or method steps.

According to various embodiments, a number of available fingers is determined in a receiver of a communication system. A threshold associated with the operation of the fingers may be adjusted based on the number of available fingers. The threshold may be a pilot signal search window threshold in accordance with an embodiment. Initially, a signal may be received by the receiver. A controller assigns at least a finger from the number of available fingers to the received signal. By adjusting the pilot signal search window threshold, the received signal may be assigned more or less of the available fingers. In accordance with an embodiment, the received signal may be assigned more or less of the fingers after the pilot signal search window threshold has been adjusted.

Figure 1:
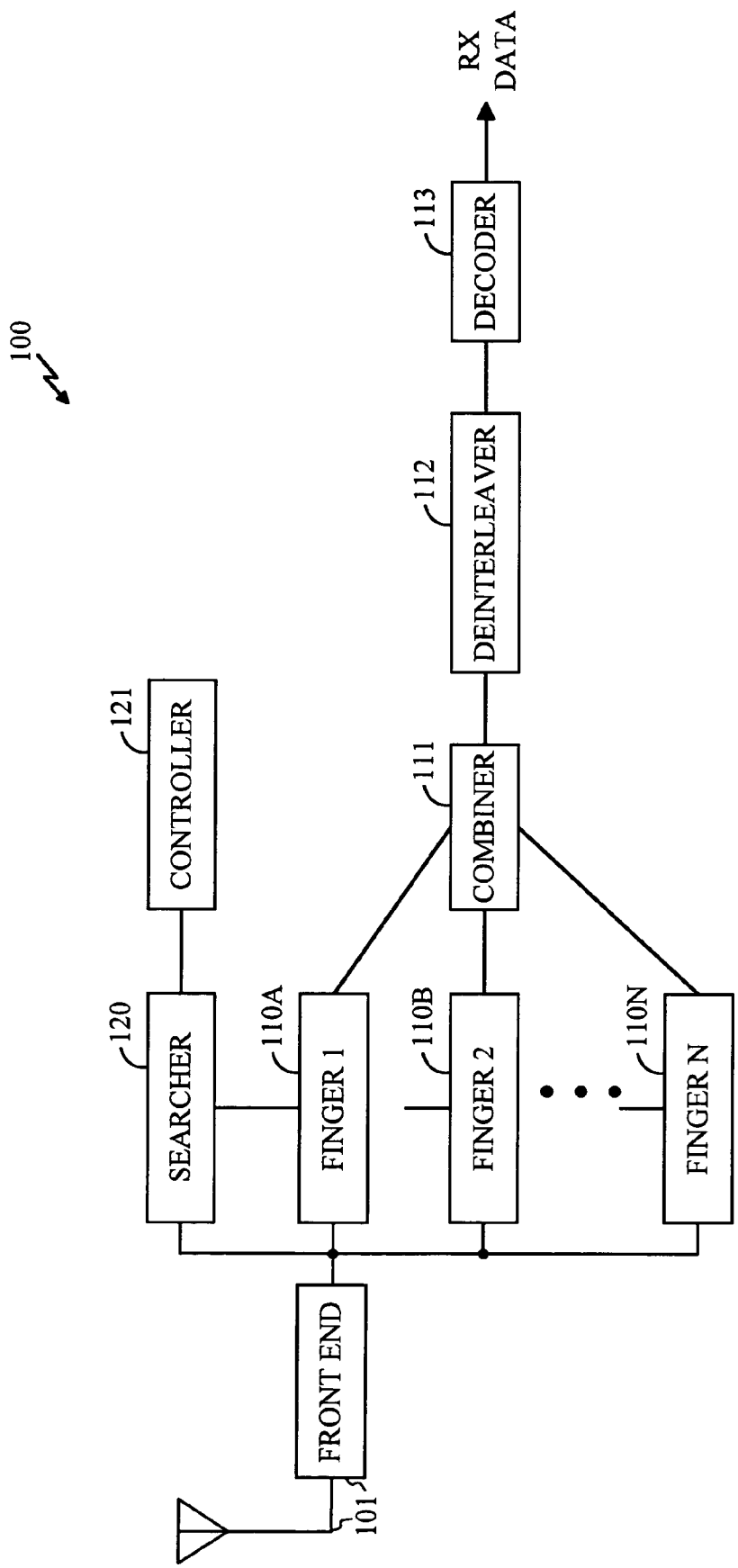
FIG. 1 depicts a block diagram of a communication system receiver.

Referring to FIG. 1, a block diagram of a communication system receiver 100 is shown in accordance with various embodiments. Receiver 100 may be configured for processing received signals in accordance with various embodiments. Radio frequency signals are received via an antenna and front-end assembly 101. The received signals are converted from radio frequencies to baseband frequency or a suitable frequency for demodulation. To demodulate the received signal, at least one finger from fingers 110A-N is assigned to the received signal for a correlation process.

When more than one finger 110A-N is assigned to the received signal, each assigned finger 110A-N routes its correlation energy to a combiner 111. Combiner 111 combines the correlation energies of a data symbol from each of the assigned fingers. The combined result passes to a de-interleaver 112 for a de-interleaving operation. A decoder 113 receives the de-interleaved data symbols, and performs a decoding operation on the received data symbols to complete the demodulation process.

Receiver 100, in accordance with various embodiments, may be incorporated for operation in any device such as a base station, or a remote unit including a mobile phone. While in operation, receiver 100 may be searching for signals. When receiver 100 is incorporated in a base station, receiver 100 searches for signals from sources such as mobile phones. Similarly, when receiver 100 is incorporated in a mobile phone, receiver 100 searches for signals from sources such as different base stations. Typically, in accordance with the CDMA standard, the receiver 100 searches for detection of pilot signals transmitted from different sources. As such, a searcher 120 continuously or periodically searches for pilot signals. Once a pilot signal is detected, the information is communicated to a controller 121. Controller 121 is communicatively coupled to different operating blocks, although not all the connections are shown. Controller 121, based on the information received from searcher 120, assigns at least one of the fingers 110A-N to demodulate the received signal.

Referring to FIG. 2, a block diagram 200 of searcher 120 is shown in accordance with various embodiments. Each pilot signal is spread at a transmitting source (not shown) in accordance with the CDMA standard. As such, a received pilot signal passes through a PN despreading operation in de-spreader 201. Receiver 100 normally has information about the PN codes used by different transmitting sources. The information may be used in the de-spreading operation. Moreover, each pilot signal also is Walsh covered at the transmitting source in accordance with a predefined Walsh function. Therefore, de-spreader 201 passes the de-spread signal to a Walsh decover element 202. The Walsh de-covered result passes to a filter 203. Filter 203 may operate as an accumulator. The accumulation process may have a finite accumulation window. The accumulated energy at the output of filter 203 passes to a comparator 204. The accumulated energy is compared to a threshold. The threshold may be the pilot signal search window threshold. If the accumulated energy satisfies the pilot signal search window threshold, controller 121 assigns at least a finger 110A-N to demodulate a signal received from the same source. If the accumulated energy fails the pilot signal search window threshold, searcher 120 continues to search for other pilot signals. Searcher 120 may search for multiple pilot signals.

The pilot signal search window threshold normally is predetermined. The level of the pilot signal search window threshold is selected to provide an assurance of a successful demodulation of a related received signal. If the threshold is selected at a low correlation energy level, a finger 110A-N may be assigned to a received signal that may not be demodulated at an adequate probability of error. Moreover, if the threshold is selected at a high correlation energy level, a finger 110A-N may not be assigned to a received signal that may have been demodulated at an adequate probability of error.

In accordance with various embodiments, the finger resources may be managed more efficiently by determining the number of available fingers and adjusting the threshold based on the available number of fingers. For example, if the receiver has a high number of available fingers, the threshold may be lowered such that more fingers are assigned to the received signal. In this case, since more fingers are assigned to the signal, the resulting combined energy may be at a higher level, thus leading to an adequate demodulation error rate. In another example, if the receiver has a low number of available fingers, the threshold may be raised such that fewer fingers are assigned to the received signal. In this case, the remaining un-assigned fingers may be reserved for other received signals. In this manner, the receiver is capable of responding to multiple received signals.

The receiver via the controller accepts or denies processing of a received signal. After the threshold is adjusted, the receiver may receive a new pilot signal. The received pilot signal is correlated within a search window. The correlation energy of the received pilot signal is compared to the adjusted search window threshold in accordance with an embodiment. Accepting or denying the processing of the received signal may be based on comparing the level of received pilot signal energy to the adjusted threshold, in accordance with an embodiment. The accepted or denied received signal may be associated with the newly received pilot signal in accordance with an embodiment. The association may be based on having a common transmitting source.

Referring to FIG. 3, a block diagram 300 of a finger 110 is shown in accordance with various embodiments. After a finger 110 is assigned to a received signal, the associated pilot signal in parallel with the received signal may be processed to demodulate the received signal. The received signal and the associated received pilot signal may be spread at the transmitting source (not shown) in accordance with the CDMA standard. Therefore, the received signal and the associated received pilot signal may pass through a PN despreading operation in de-spreader 301. The received signal additionally may be spread according to another PN code, commonly known as a short PN code. Accordingly, the received signal may be de-spread at de-spreader 302. Receiver 100 normally has information about the PN codes used by different transmitting sources. The information may be used in the de-spreading process. Moreover, the received signal and the pilot signal may be Walsh covered at the transmitting source in accordance with corresponding pre-defined Walsh functions. Therefore, de-spreader 301 passes the de-spread pilot signal to a Walsh decover 303, and de-spreader 302 passes the despread received signal to a Walsh decover 304. The Walsh de-covered result of the pilot signal passes to a filter 306. The Walsh de-covered result of the received signal passes to a filter 305. Filters 305 and 306 may operate as accumulators. The accumulation may have a finite accumulation window. The accumulated energies from filters 305 and 306 pass to a multiplier 307. The operation of multiplier 307 may be according to a dot-product operation. If other fingers are assigned to the received signal, the result from multiplier 307 passes to combiner 111 for combining with the results from other assigned fingers. The timing used in operations of each finger may be different depending on the multi-path signals.

One or more of the fingers assigned to the demodulation process of a received signal may be operating in accordance with a timing that produces erroneous result. As such, when the result from such a finger is used and combined with the result from another finger, the demodulation process is degraded. To prevent such a problem, when processing the associated pilot signal, two indicators are also produced. The first indicator is a lock/unlock indicator. The second indicator is a combine/un-combine indicator.

Lock/unlock indicator indicates whether the associated pilot signal being processed provides adequate energy. After some accumulation of energy in a filter 350, the pilot signal energy is compared to a lock/unlock threshold in a comparator 351. If a unlock indication is produced, the result from this finger is ignored in the combining process at combiner 111. Although the pilot signal may be in a lock condition, the produced energy may be inadequate for a combine operation with other fingers. After some accumulation of energy in a filter 360, the pilot signal energy is compared to a combine/un-combine threshold in a comparator 361. If a combine indication is produced, the result from this finger is combined with results from other fingers.

Figure 4:
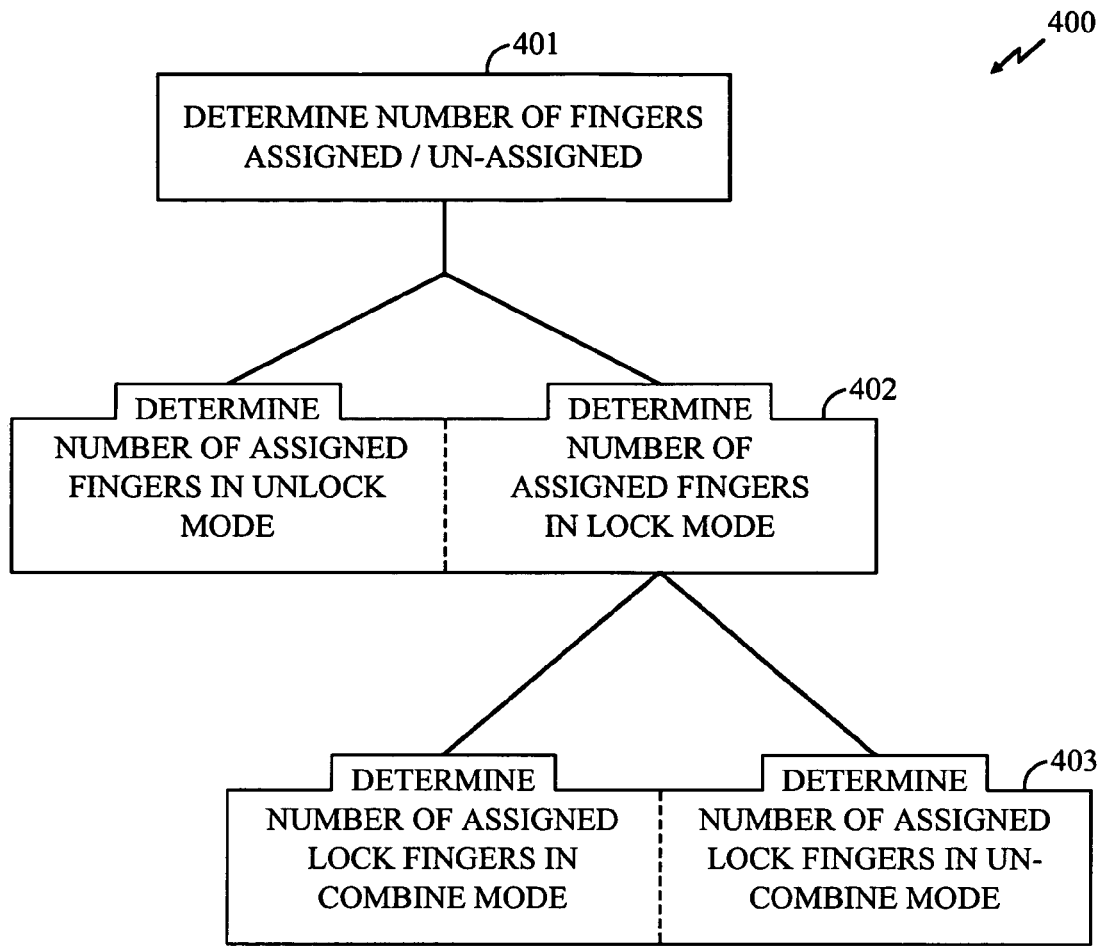
FIG. 4 depicts a flow chart of the status of finger resources for determining the available number of finger resources.

Referring to FIG. 4, a flow chart 400 for determining the status of the fingers is shown in accordance with various embodiments. Flow chart 400 may be used to determine the availability of the fingers. At step 401, the numbers of assigned and un-assigned fingers are determined. The number of un-assigned fingers may be included in the number of available fingers. The assigned fingers may be either in the lock condition or unlock condition. At step 402, the number of assigned fingers in the unlock and lock conditions are determined. Since the results from the assigned unlock fingers are not included in the demodulation process, the number of assigned unlock fingers may be added to the number of available fingers. The assigned fingers in lock condition may be either in the combine condition or un-combine condition. At step 403, the number of fingers in the combine and un-combine conditions are determined. Since the fingers in the un-combine condition are not included in the demodulation process, the number of un-combine fingers may be added to the number of available fingers. In accordance with various embodiments, the total number of available fingers may change as a result of adjusting the combine/un-combine threshold at block 361 (shown in FIG. 3), or the lock/unlock threshold at block 351 (shown in FIG. 3), or both.

After a signal is received, at least a finger may be assigned to the received signal. By adjusting the lock/unlock threshold, more or less of fingers may switch from lock to unlock condition or from unlock to lock condition. For example, if the lock/unlock threshold is raised, a finger in lock condition may switch to unlock condition because the accumulated energy may not meet the newly raised lock/unlock threshold. As such, the lock/unlock indicator switches from lock condition to unlock condition. The fingers that switch to unlock condition may be added to the available fingers for a new assignment. Consequently, the adjustment may change the total number of available fingers. Several fingers may be in the unlock condition for a period of time. In accordance with an embodiment, the fingers that have been in the unlock condition for a long period of time may be selected as the first candidates for release. Once a finger is released, it may be added to the total number of available fingers.

Moreover, by adjusting the combine/un-combine threshold, more or less of fingers may switch from the combine to un-combine condition or from un-combine to the combine condition. For example, if the combine/un-combine threshold is raised, a finger in the combine condition may switch to un-combine condition because the accumulated energy may not meet the newly raised combine/un-combine threshold. As such, the combine/un-combine indicator switches from the combine condition to un-combine condition. The fingers that switch to un-combine condition may be added to the available fingers. Consequently, the adjustment may change the total number of available fingers. Several fingers may be in the un-combine condition for a period of time. In accordance with an embodiment, the fingers that have been in the un-combine condition for a long period of time may be selected as the first candidates for release. Once a finger is released, it may be added to the total number of available fingers.

In accordance with the CDMA standards, a receiver, such as receiver 100, keeps a list of a set of base stations that are prioritized according to their availability and success of providing an adequate signal at the receiver 100. The sets of base stations are commonly called Active set, Candidate set, and Neighbor Set. Each set identifies a set of base stations for communication with a mobile station in the communication system. The Active set identifies a set of base stations assigned for communication with the mobile station. The Candidate set identifies a set of base stations with sufficient pilot signal strength at the mobile station that are suitable for communication with the mobile station. The Active set is exclusive of the Candidate set. The Neighbor set identifies a set of base stations for possible communications with the mobile station. The Neighbor set is exclusive of the Active and Candidate sets.

By adjusting, individually or in combinations, the pilot signal search window threshold, lock/unlock threshold, and combine/un-combine threshold, at least one base station may move from one set to another set among the Active, Candidate and Neighbor sets of base stations, in accordance with an embodiment. After adjusting any one of the thresholds, a base station may better meet the criteria for another set. For example, after adjusting the pilot signal search window threshold, a base station may not be suitable to be in the Active set. Therefore, the base station is moved from the Active set to a more suitable set, such as the Candidate set, for example. Once a base station is moved from the Active set to the Candidate set, a finger assigned to a signal from the base station may be released, and added to the total number of available fingers.

Figure 5:
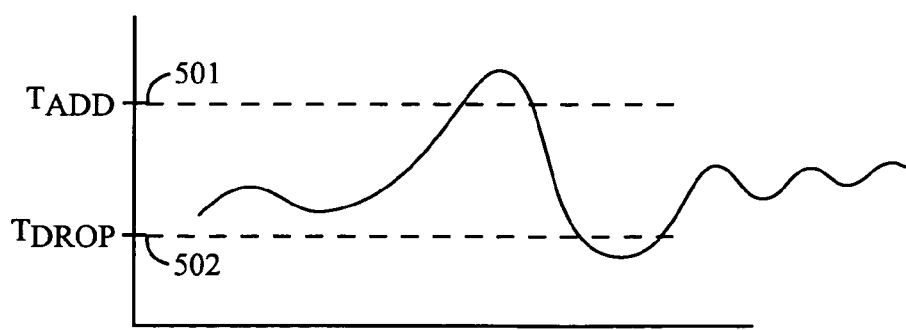
FIG. 5 depicts relationship of an add-threshold and a drop-threshold to provide a hysteresis effect for changing the status of a finger.

Referring to FIG. 5, in accordance with various embodiments, each one of the operations in receiver 100, including searching for pilot signals operation, locking/unlocking operation, and combining/un-combining operation, may include use of an add-threshold and a drop-threshold. For example, in case of the pilot signal search window threshold, every time the received pilot signal energy at comparator 204 moves above an add-threshold 501, the pilot signal energy satisfies the threshold. Moreover, when the received pilot signal energy at comparator 204 drops below a drop-threshold 502, the pilot signal energy fails to satisfy the threshold. In another example, in case of the lock/unlock threshold, when the pilot signal energy moves above add-threshold 501, the lock/unlock indictor indicates a lock condition. Similarly, when the pilot signal energy drops below drop-threshold 502, the lock/unlock indictor indicates the unlock condition. In another example, in case of the combine/un-combine threshold, when the pilot signal energy moves above add-threshold 501, the combine/un-combine indictor indicates a combine condition. Similarly, when the pilot signal energy drops below drop-threshold 502, the combine/un-combine indictor indicates an un-combine condition. Moreover, the operations for determining the Active set, Candidate set, and Neighbor set of base stations in the communication system may include use of add-threshold 501 and drop-threshold 502. As such, a hysteresis is created for stability of the process. Pilot signal search window threshold, lock/unlock threshold, and combine/un-combine threshold, each may have a corresponding add-threshold and a corresponding drop-threshold. When a threshold is adjusted, in accordance with various embodiments, the threshold may be either a corresponding add-threshold 501, or a corresponding drop-threshold 502, or both.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A method for a communication system, comprising:
    determining a number of available fingers in a receiver of said communication system, based on at least one of:
    a) lock or unlock condition of said fingers,
    b) a time period of lock or unlock condition of said fingers,
    c) a combine or un-combine condition of said fingers,
    d) a time period of combine or un-combine condition of said fingers, and
    e) an assign or un-assign condition of said fingers;
    adjusting a pilot signal energy search window threshold based on said number of available fingers thereby allowing availability of a different number of fingers for processing received signals by changing condition of one of said fingers as determined in at least one of (a)–(e).

2. The method as recited in claim 1 further comprising:
    accepting or denying processing of a received signal based on whether a correlation energy of a received pilot signal meets said adjusted pilot signal energy search window threshold, wherein said received signal is associated with said pilot signal.

3. The method as recited in claim 1 further comprising:
    determining at least one of Active set, Candidate set, and Neighbor set of base stations in said communication system, wherein each set identifies at least one base station for communication with a mobile station in said communication system, wherein said Active set identifies at least one base station assigned for communication with said mobile station, wherein said Candidate set identifies at least one station with sufficient pilot signal strength at said mobile station and for communication with said mobile station, wherein said Active set is exclusive of said Candidate set, wherein said Neighbor set identifies at least one base station for possible communication with said mobile station, wherein said Neighbor set is exclusive of said Active and Candidate sets;
    moving at least one base station from one set to another set among said Active, Candidate and Neighbor sets of base stations based on said adjusted pilot signal energy search window threshold.

* * * * *